United States Patent [19]
Fenn et al.

[11] Patent Number: 5,503,183
[45] Date of Patent: Apr. 2, 1996

[54] HOT-WATER THERMOREGULATING VALVE

[75] Inventors: Gordon W. Fenn, Brevard, N.C.; Min H. Oh, Ansan, Rep. of Korea

[73] Assignee: Frontier, Inc., Ann Arbor, Mich.

[21] Appl. No.: 478,896

[22] Filed: Jun. 7, 1995

[51] Int. Cl.[6] .................................................. G05D 23/19
[52] U.S. Cl. .................... 137/597; 137/495; 236/12.12; 236/12.15
[58] Field of Search ................................. 137/100, 495, 137/595; 236/12.12, 12.15, 12.21

[56]          References Cited

U.S. PATENT DOCUMENTS

| | | | |
|---|---|---|---|
| 1,932,148 | 10/1933 | Schneider et al. | 236/12.15 |
| 2,550,069 | 4/1951 | Kirk | 236/12.15 |
| 4,558,817 | 12/1985 | Kiendl | 236/12.12 |
| 4,923,092 | 5/1990 | Kirschner et al. | 137/100 |
| 5,033,671 | 7/1991 | Shiba et al. | 236/12.12 |

*Primary Examiner*—Stephen M. Hepperle
*Attorney, Agent, or Firm*—George L. Boller

[57]             ABSTRACT

A hot-water thermoregulating valve is disclosed including a hot-water supply cap; a cold-water supply cap; a main body located between the hot-water supply cap and cold-water supply cap; first and second disks formed with a circular hole on the center, respectively; first and second stems for opening/closing the first and second disks and formed with a smaller-diameter portion inserted into the slide cavity of the first and second protrusions, a taper portion inserted into the hole of the first and second disks, and a larger-diameter portion having a reception hollow; first and second pistons contained in the main body, one end being coupled to the reception hollow of the first and second stems, the other end coming into contact with the damper, and having first and second springs; and a step motor, thereby automatically controlling the temperature of hot water.

1 Claim, 3 Drawing Sheets

5,503,183

HOT-WATER THERMOREGULATING VALVE

BACKGROUND OF THE INVENTION

The present invention relates to a valve for mixing hot and cold water to thereby control the temperature of hot water supplied from a heat exchanger such as a boiler and water heater, and more particularly, to a hot-water thermoregulating valve for simultaneously or selectively supplying middle-temperature hot water mixed with hot and cold water, and high-temperature hot water not mixed with cold water.

In a conventional boiler and water heater, the amount of gas to be fed to the burner is controlled to regulate the temperature of hot water discharged. Cold water is supplied after its temperature is raised by the heat exchange with high-temperature burned gas generated from the burner. Here, by using a gas-amount control valve installed on a gas supply pipe, the amount of gas supplied is controlled to increase or decrease the temperature of hot water. However, in a case in which the pressure of cold water is lower or higher than a normal value, or a lot of hot water is used at one time, the temperature of hot water is not uniform, causing inconveniences.

In addition, in order to regulate the temperature of hot water in a place where hot water is used, cold and hot water are supplied simultaneously, and a cold-water valve and hot-water valve are provided for manual operation. For this reason, an appropriate temperature of hot water cannot be maintained automatically.

SUMMARY OF THE INVENTION

Therefore, it is an object of the present invention to provide a hot-water thermoregulating valve for simultaneously or selectively supplying relatively low middle-temperature hot water mixed with hot and cold water, and high-temperature hot water not mixed with cold water.

It is another object of the present invention to provide a hot-water thermoregulating valve for automatically controlling the temperatures of middle-temperature hot water and high-temperature hot water.

To accomplish the objects of the present invention, there is provided a hot-water thermoregulating valve comprising: a hot-water supply cap having a hot-water intake, a first hot-water outlet, and a first protrusion laterally formed with a slide cavity at the center, the cap being opened on one side; a cold-water supply cap having a cold-water intake, and a second protrusion formed with a slide cavity at the center and symmetrically formed with the first protrusion, the cap being opened on one side; a main body located between the hot-water supply cap and cold-water supply cap and having a second hot-water outlet and a damper operating by an operation shaft of a lever; first and second disks formed with a circular hole on the center, respectively, and for partitioning the main body and cold-water supply cap and the main body and hot-water supply cap; first and second stems for opening/closing the first and second disks and formed with a smaller-diameter portion inserted into the slide cavity of the first and second protrusions, a taper portion inserted into the hole of the first and second disks, and a larger-diameter portion having a reception hollow; first and second pistons contained in the main body, one end being coupled to the reception hollow of the first and second stems, the other end coming into contact with the damper, and having first and second springs; and a step motor for driving the lever and operation shaft for rotating the damper of the main body.

According to the features of the present invention, the temperature of hot water discharged through the first and second hot-water outlets is automatically controlled to a desired temperature by installing a temperature sensor along a hot-water supply pipe connected to the first and second hot-water outlets to control the amount of gas supply or the step motor in accordance with the variation of temperature of hot water to be supplied.

BRIEF DESCRIPTION OF THE ATTACHED DRAWINGS

DETAILED DESCRIPTION OF THE INVENTION

Hereinafter, a preferred embodiment of the hot-water thermoregulating valve of the present invention will be described with reference to the attached drawings.

Figure 1:
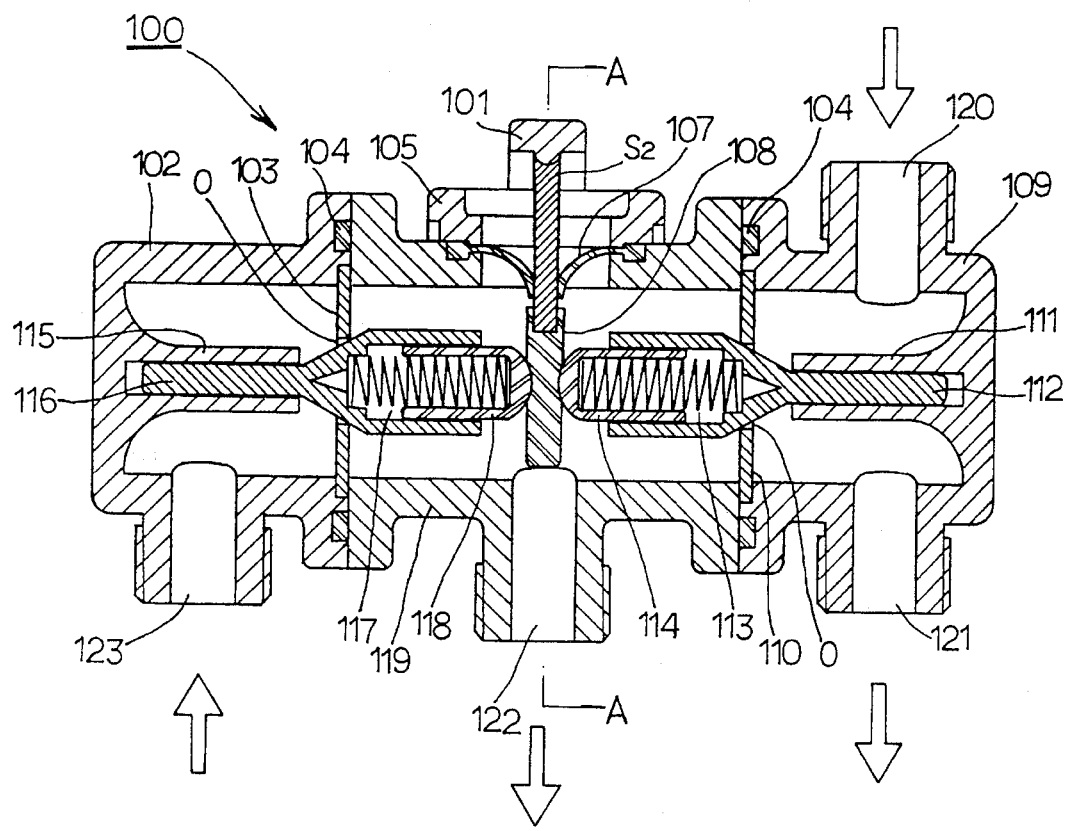
FIG. 1 is a cross-sectional view of a hot-water thermoregulating valve of the present invention.

Referring to FIG. 1, a hot-water thermoregulating valve 100 comprises a cold-water supply cap 102 with a cold-water intake 123 for supplying cold water, a hot-water supply cap 109 having a hot-water intake 120 through which hot water comes and a first hot-water outlet 121 for discharging hot water, and a main body 119 located between cold-water supply cap 102 and hot-water supply cap 109 and having a second hot-water outlet 122 and a lever 101 operating when the mixing ratio of cold and hot water is controlled. Cold-water supply cap 102 and hot-water supply cap 109 are symmetric except that hot-water intake 120 is additionally provided in the upper portion of hot-water supply cap 109.

The inner spaces of cold-water supply cap 102, hot-water supply cap 109 and main body 119 are separated by first and second disks 110 and 103. A circular hole 0 is formed on the center of first and second disks 110 and 103. Hole 0 is opened or closed by first and second stems 112 and 116 in which a smaller-diameter portion, taper portion, and larger-diameter portion are formed. A pair of 0-rings 104 for preventing water from leakage are provided on the contact surfaces between main body 119 and cold-water supply cap 102 and between main body 119 and hot-water supply cap 109.

Figure 4:
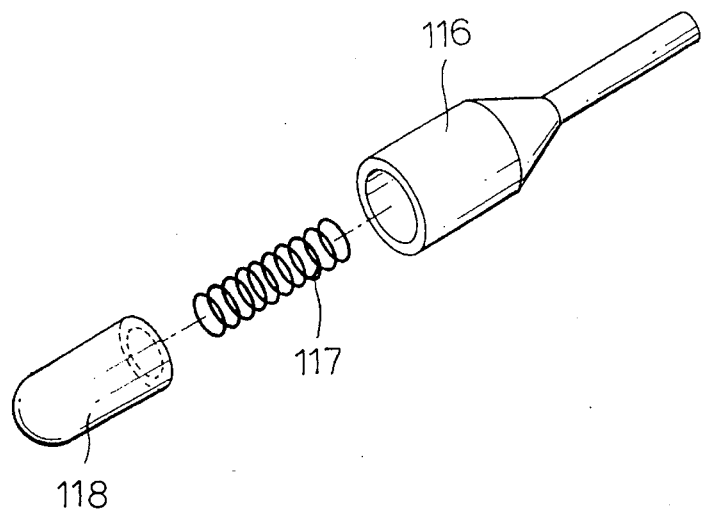
FIG. 4 is an exploded perspective view of the stem, spring, and piston.

A second protrusion 115 with a slide cavity at its center is formed in cold-water supply cap 102. The smaller-diameter portion of second stem 116 is inserted into second protrusion 115. As shown in FIG. 4, second stem 116 is constructed with a smaller-diameter portion inserted into the slide cavity of second protrusion 115, a taper portion for opening/closing hole 0 of second disk 103, and a larger-diameter portion having a reception hollow thereinside. The taper portion of second stem 116 is inserted into hole 0 of second disk 103 so as to open/close hole 0. A second piston 118 is inserted into the reception hollow of the larger-diameter portion of second stem 116. A second spring 117 is put into piston 118. Accordingly, second stem 116 and second piston 118 repulse each other by second spring 117.

Hot-water supply cap 109 is to supply hot water heated by a heat exchanger (not shown), having hot-water intake 120 into which hot water flows and first hot-water outlet 121 through which hot water is discharged. A first protrusion 111 which is the same as second protrusion 115 of cold-water supply cap 102 in function and configuration is formed in the hot-water supply cap. First stem 112 inserted into first protrusion 111, first spring 113 and first piston 114 are the same as second stem 116, second spring 117 and second piston 118 of cold-water supply cap 102 in structure and operation.

In main body 119, hot and cold water is mixed. The main body has second hot-water outlet 122, and a damper 108 whose sides come into contact with first or second piston 114 or 118 at the center. Damper 108 acts to control the movement of first and second stems 112 and 116. Damper 108 is constructed to be movable left and right by lever 101 connected thereto and an operation shaft S2.

Figure 2:
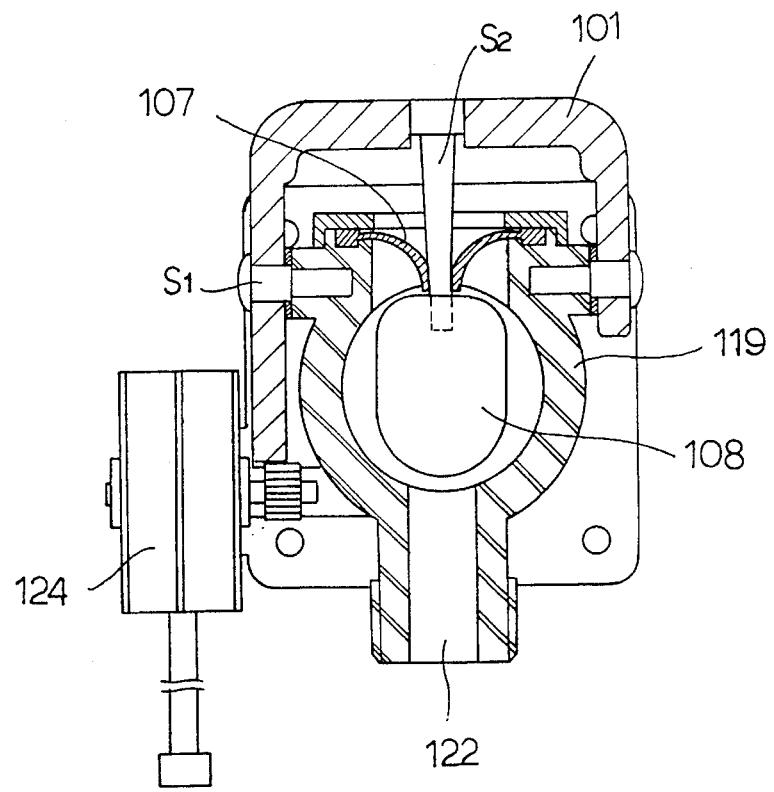
FIG. 2 is a side sectional view of the hot-water thermoregulating valve cut along with line A—A of FIG. 1.
Figure 3:
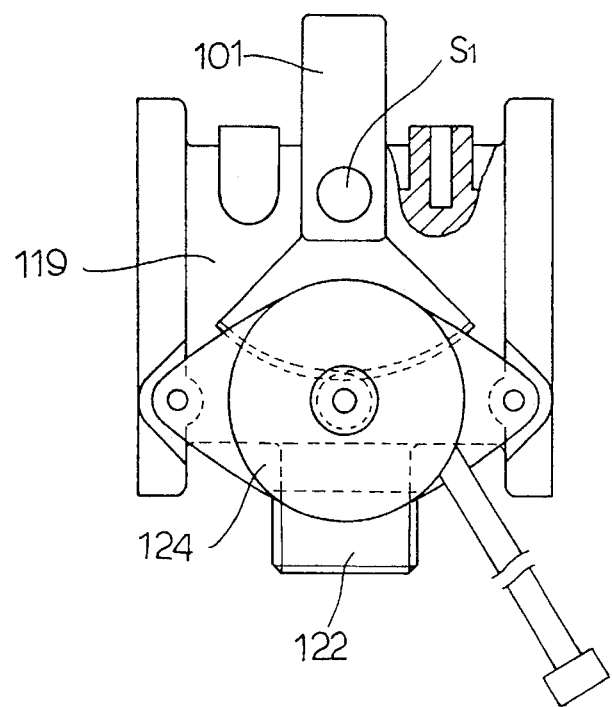
FIG. 3 is a front view of the main body of the valve, which shows the position of a step motor for driving the lever of FIG. 1.

As shown in FIGS. 2 and 3, lever 101 is, being connected to a step motor 124, driven by stages to control the amount of cold and hot water coming into main body 119. In the upper portion of damper 108, a bellows 107, shielding means for preventing water of main body 119 from leakage, is installed and connected to operation shaft S2 extended downward from lever 101. Lever 101 is rotatably installed by support shaft S1. Bellows 107 is installed on main body 119 by a cover 105.

FIG. 2 shows the installation state of step motor 124 for driving and lever 101. Referring to FIG. 2, step motor 124 operates by stages according to a control signal. As step motor 124 rotates, lever 101 and operation shaft S2 are rotated to move damper 108 by a predetermined angle. Lever 101 is rotatably fixed to main body 119 by support shaft S1. As shown in FIGS. 2 and 3, as step motor 124 is driven, lever 101 and operation shaft S2 move left and right. Accordingly, damper 108 also moves left and right. Step motor 124 is usually controlled by a microcomputer (not shown). Second hot-water outlet 122 through which mixed water of hot and cold water goes is provided in main body 119.

The operation and effect of hot-water thermoregulating valve 100 of the present invention will be explained below.

The hot-water thermoregulating valve of the present invention is able to supply high-temperature hot water fed to the heat exchanger without change, and to supply middle-temperature hot water mixed with the high-temperature hot water and cold water.

When high-temperature hot water is used, high-temperature hot water coming into hot-water intake 120 from the heat exchanger is discharged through first hot-water outlet 121 without change. The temperature of the high-temperature water is controlled in such a manner that a microcomputer compares a set hot-water using temperature with a measured hot-water temperature (sensed by a temperature sensor installed along a flow path) so as to control the amount of gas supply and thereby control the amount of burned gas fed to the heat exchanger.

When the middle-temperature hot water is used, hot water coming through hot-water intake 120 of hot-water supply cap 109 and cold water coming through cold-water intake 123 of cold-water supply cap 102 are mixed in main body 119 and discharged through second hot-water outlet 122.

When an opening/closing valve is opened to use the middle-temperature hot water, the water pressure of main body 119 becomes lower than that of hot-water and cold-water supply caps 109 and 102. Therefore, the hot water contained in hot-water supply cap 109 and cold water contained in cold-water supply cap 102 push first and second stems 112 and 116 toward damper 108, and enter main body 119 through hole 0 of first and second disks 110 and 103.

The hot and cold water is mixed in main body 119 to become a relatively low middle-temperature hot water. The middle-temperature hot water is discharged through second hot-water outlet 122.

The temperature control of middle-temperature hot water is carried out by comparing a hot-water using temperature set by the microcomputer (not shown) and a discharged hot-water temperature (sensed by a temperature sensor installed along a flow path) and thereby appropriately operating step motor 124. This adjusts the mixing ratio of hot and cold water.

If the discharged hot-water temperature is lower than the set hot-water using temperature, the amount of hot-water flow is increased. If not, the amount of cold-water flow is increased.

The microcomputer compares the hot-water using temperature and a hot-water temperature (sensed by a temperature sensor installed along a flow path) discharged through second hot-water outlet 122, and operates step motor 124 so that the hot-water temperature is equal to the set hot-water using temperature. This moves damper 108.

Figure 5:
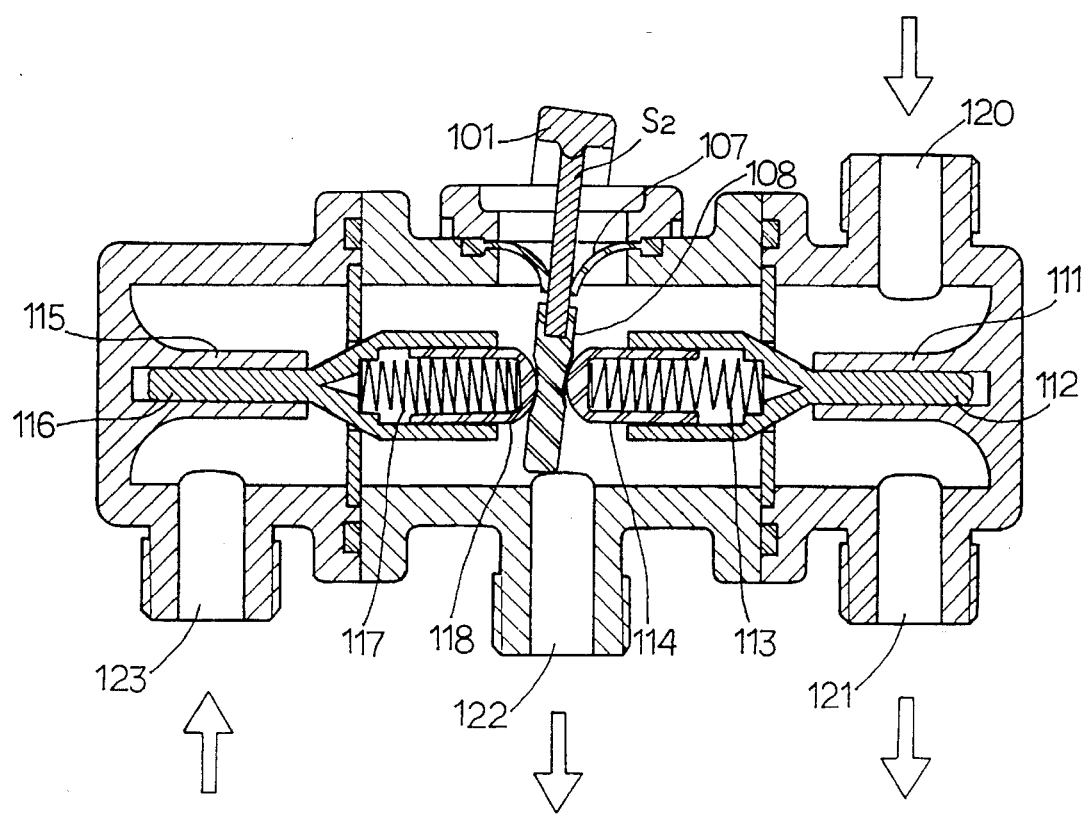
FIG. 5 is a cross-sectional view depicting the operation state of the hot-water thermoregulating valve of the present invention.

For instance, if the hot-water temperature is lower than the set hot-water using temperature, damper 108 moves left by step motor 124, lever 101 and operation shaft S2, as shown in FIG. 5. In this case first piston 114 moves toward damper 108 by first spring 113. Meanwhile, second piston 118 enters the reception hollow of second stem 116 by the compression force of damper 108.

In this state, the amount of hot water coming into main body 119 while pushing first stem 112 is greater than the amount of cold water coming into main body while pushing second stem 116. As a result, middle-temperature hot water mixed at the set hot-water using temperature is discharged through second hot-water outlet 122.

The temperature of the middle-temperature hot water discharged through second hot-water outlet 122 is controlled as lever 101, operation shaft S2 and damper 108 move left or right by step motor 124 operated according to the output signal of the microcomputer.

As described above, since the hot-water thermoregulating valve of the present invention is able to simultaneously or selectively supply high-temperature hot water and middle-temperature hot water, high-temperature hot water is supplied to portions which require high-temperature hot water, such as a shower bath, middle-temperature hot water to portions which require lower-temperature hot water, such as a sink and washing machine.

Furthermore, for convenience, the present invention automatically controls a hot-water using temperature in which the high-temperature hot water and middle-temperature hot water are set.

What is claimed is:

1. A hot-water thermoregulating valve comprising:

a hot-water supply cap having a hot-water intake, a first hot-water outlet, and a first protrusion laterally formed with a slide cavity at the center, said cap being opened on one side;

a cold-water supply cap having a cold-water intake, and a second protrusion formed with a slide cavity at the center and symmetrically formed with said first protrusion, said cap being opened on one side;

a main body located between said hot-water supply cap and cold-water supply cap and having a second hot-water outlet and a damper operating by an operation shaft of a lever;

first and second disks formed with a circular hole on the center, respectively, and for partitioning said main body and cold-water supply cap and said main body and hot-water supply cap;

first and second stems for opening/closing said first and second disks and formed with a smaller-diameter portion inserted into the slide cavity of said first and second protrusions, a taper portion inserted into the hole of said first and second disks, and a larger-diameter portion having a reception hollow;

first and second pistons contained in said main body, one end being coupled to the reception hollow of said first and second stems, the other end coming into contact with said damper, and having first and second springs; and a step motor for driving said lever and operation shaft for rotating said damper of said main body.

* * * * *